(12) United States Patent
Chen et al.

(10) Patent No.: US 12,024,100 B2
(45) Date of Patent: Jul. 2, 2024

(54) DEVICE-LEVEL FAULT DETECTION

(71) Applicant: Pony AI Inc., Grand Cayman (KY)

(72) Inventors: Kai Chen, San Jose, CA (US); Pingfan Meng, San Bruno, CA (US)

(73) Assignee: Pony AI Inc., Grand Cayman (KY)

( * ) Notice: Subject to any disclaimer, the term of this patent is extended or adjusted under 35 U.S.C. 154(b) by 392 days.

(21) Appl. No.: 17/324,771

(22) Filed: May 19, 2021

(65) Prior Publication Data

US 2022/0371530 A1 Nov. 24, 2022

(51) Int. Cl.
  *B60R 16/023* (2006.01)
  *G05B 23/02* (2006.01)

(52) U.S. Cl.
  CPC ...... *B60R 16/0232* (2013.01); *G05B 23/0213* (2013.01); *G05B 23/0283* (2013.01)

(58) Field of Classification Search
  CPC ............ B60R 16/0232; G05B 23/0213; G05B 23/0283; G05B 2219/2637; G05B 23/0291
  See application file for complete search history.

(56) References Cited

U.S. PATENT DOCUMENTS

| | | | | |
|---|---|---|---|---|
| 6,933,842 B2* | 8/2005 | Oesterling | ........ | B60R 16/0234 701/31.4 |
| 8,055,400 B2* | 11/2011 | Grenn | ........ | G05B 23/0272 701/31.4 |
| 8,473,145 B2* | 6/2013 | Biswas | ........ | G07C 5/0808 701/33.2 |
| 8,527,137 B2* | 9/2013 | Sakakibara | ........ | G07C 5/085 701/29.2 |
| 8,577,663 B2 | 11/2013 | Lu et al. | | |
| 8,732,112 B2* | 5/2014 | Singh | ........ | G07C 5/0816 706/51 |
| 10,665,040 B2* | 5/2020 | Colvin | ........ | G07C 5/0808 |
| 2004/0138790 A1 | 7/2004 | Kapolka et al. | | |
| 2005/0085964 A1* | 4/2005 | Knapp | ........ | G05B 23/0283 701/31.4 |
| 2009/0089134 A1* | 4/2009 | Uyeki | ........ | G06Q 10/02 705/7.19 |
| 2012/0303348 A1* | 11/2012 | Lu | ........ | G06F 11/079 703/13 |
| 2013/0030641 A1* | 1/2013 | Olsen, III | ........ | G07C 5/0808 701/31.6 |
| 2013/0159240 A1* | 6/2013 | Singh | ........ | G05B 23/0275 706/51 |

(Continued)

FOREIGN PATENT DOCUMENTS

WO 2018065890 A1 4/2018

*Primary Examiner* — Nay Tun
(74) *Attorney, Agent, or Firm* — Sheppard, Mullin, Richter & Hampton LLP; Xin Xie

(57) ABSTRACT

Described herein are systems, methods, and non-transitory computer-readable media for self-detection of a fault condition by a vehicle component, generation of a device health code that includes multiple tiers of information relating to the fault condition experienced by the vehicle component, and broadcasting of the device health code to one or more other vehicle components via one or more vehicle communication networks. A recommended vehicle response measure indicated by a reaction code in the device health code can then be taken or alternate vehicle response may be selected and initiated based on an evaluation of current vehicle operational data.

17 Claims, 7 Drawing Sheets

(56) References Cited

U.S. PATENT DOCUMENTS

| | | | |
|---|---|---|---|
| 2014/0095211 A1* | 4/2014 | Gloerstad | G06Q 40/08 |
| | | | 705/4 |
| 2015/0178998 A1 | 6/2015 | Attard et al. | |
| 2015/0269793 A1* | 9/2015 | Collins | B60W 50/04 |
| | | | 701/31.4 |
| 2016/0010537 A1* | 1/2016 | Strode | G01M 3/025 |
| | | | 123/41.15 |
| 2016/0110066 A1* | 4/2016 | McCormick | G07C 5/008 |
| | | | 715/243 |
| 2016/0163135 A1 | 6/2016 | Olsen, III et al. | |
| 2017/0024943 A1* | 1/2017 | Wodecki | G05B 23/0294 |
| 2017/0154479 A1* | 6/2017 | Kim | G05B 19/042 |
| 2019/0018408 A1 | 1/2019 | Gulati et al. | |
| 2019/0371093 A1 | 12/2019 | Edren et al. | |
| 2020/0028946 A1* | 1/2020 | Vora | H04L 1/1874 |
| 2020/0389469 A1* | 12/2020 | Litichever | H04W 4/40 |
| 2021/0133081 A1* | 5/2021 | Kelly | G06F 11/0772 |
| 2021/0258327 A1* | 8/2021 | Felke | G05B 23/0283 |
| 2022/0187819 A1* | 6/2022 | Shalaby | G05B 23/0283 |
| 2022/0319255 A1* | 10/2022 | Palai | G07C 5/0808 |

\* cited by examiner

DEVICE-LEVEL FAULT DETECTION

FIELD OF THE INVENTION

The present invention relates generally to device-level fault detection, and more particularly, in some embodiments, to self-detection of a fault condition by a vehicle component and generation of a device fault code indicative of the fault condition.

BACKGROUND

Modern vehicles include a myriad of different vehicle components. Automated vehicle technologies have advanced dramatically in the last few decades, and the number of vehicle components needed to support such technologies has grown commensurately. In particular, modern vehicles include more sensors, more processing circuits, and so forth than in the past in order to support more advanced technologies such as adaptive cruise control, blind spot detection, lane keeping, object avoidance, and the like. Autonomous vehicles include an even greater number of vehicle components in order to support the more complex processing (e.g., object detection, instance segmentation, automated vehicle navigation, etc.) needed to enable autonomous vehicle operation.

Vehicle components, such as those in an autonomous vehicle, may include a variety of different types of components (e.g., sensors, customized computing chips, computing systems, etc.) that can experience different types of fault conditions. Described herein are technical solutions that address technical problems associated with identifying a fault condition experienced by a vehicle component and determining an appropriate vehicle response to the fault condition.

SUMMARY

In an example embodiment, a computer-implemented method for vehicle component fault detection is disclosed. The method includes determining that a vehicle component has experienced a fault condition, generating a device health code that includes multiple tiers of information relating to the fault condition, and broadcasting the device health code on a first vehicle communication network.

In an example embodiment, the method further includes broadcasting the device health code on a second vehicle communication different from the first vehicle communication network.

In an example embodiment, the second vehicle communication network is a time-sensitive vehicle communication network.

In an example embodiment, the device health code includes a reaction code indicative of a recommended reaction to the fault condition, wherein the recommended reaction is one of a set of predetermined vehicle reactions.

In an example embodiment, the recommended reaction is to reduce a vehicle speed to compensate for an increased processing latency associated with the fault condition.

In an example embodiment, the method further includes collecting vehicle operational data for a period of time subsequent to implementation of the recommended reaction and utilizing the vehicle operational data to train a machine learning model to determine a vehicle reaction to the fault condition.

In an example embodiment, the multiple tiers of information include a first information tier and a second information. In an example embodiment, the first information tier includes a fault category code indicative of a fault category that includes the fault condition and the second information tier includes a cross-device error code indicating that the fault condition is one of a set of fault conditions specific to a set of vehicle components that share one or more operating characteristics.

In an example embodiment, the multiple tiers of information further include a third information tier that includes a device-specific error code indicating a more detailed characteristic of the fault condition that is not determinable from the fault category code or the cross-device error code.

In an example embodiment, the method further includes determining that the vehicle component has recovered from the fault condition, generating a second health code indicating that the vehicle component is not experiencing the fault condition, and broadcasting the second health code on the vehicle communication network.

In an example embodiment, determining that the vehicle component has experienced the fault condition includes executing, by the vehicle component, a detection algorithm to self-identify the presence of the fault condition.

In an example embodiment, a system for vehicle component fault detection is disclosed. The system includes at least one processor and at least one memory storing computer-executable instructions. The at least one processor is configured to access the at least one memory and execute the computer-executable instructions to perform a set of operations including determining that a vehicle component has experienced a fault condition, generating a device health code that includes multiple tiers of information relating to the fault condition, and broadcasting the device health code on a first vehicle communication network. The above-described system is further configured to perform any of the operations/functions and may include any of the additional features/aspects of example embodiments of the invention described above in relation to example computer-implemented methods of the invention.

In an example embodiment, a computer program product for vehicle component fault detection is disclosed. The computer program product includes a non-transitory computer-readable medium storing computer/machine-executable instructions that responsive to execution by a processing circuit including one or more processing units cause a method to be performed. This method includes determining that a vehicle component has experienced a fault condition, generating a device health code that includes multiple tiers of information relating to the fault condition, and broadcasting the device health code on a first vehicle communication network. The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
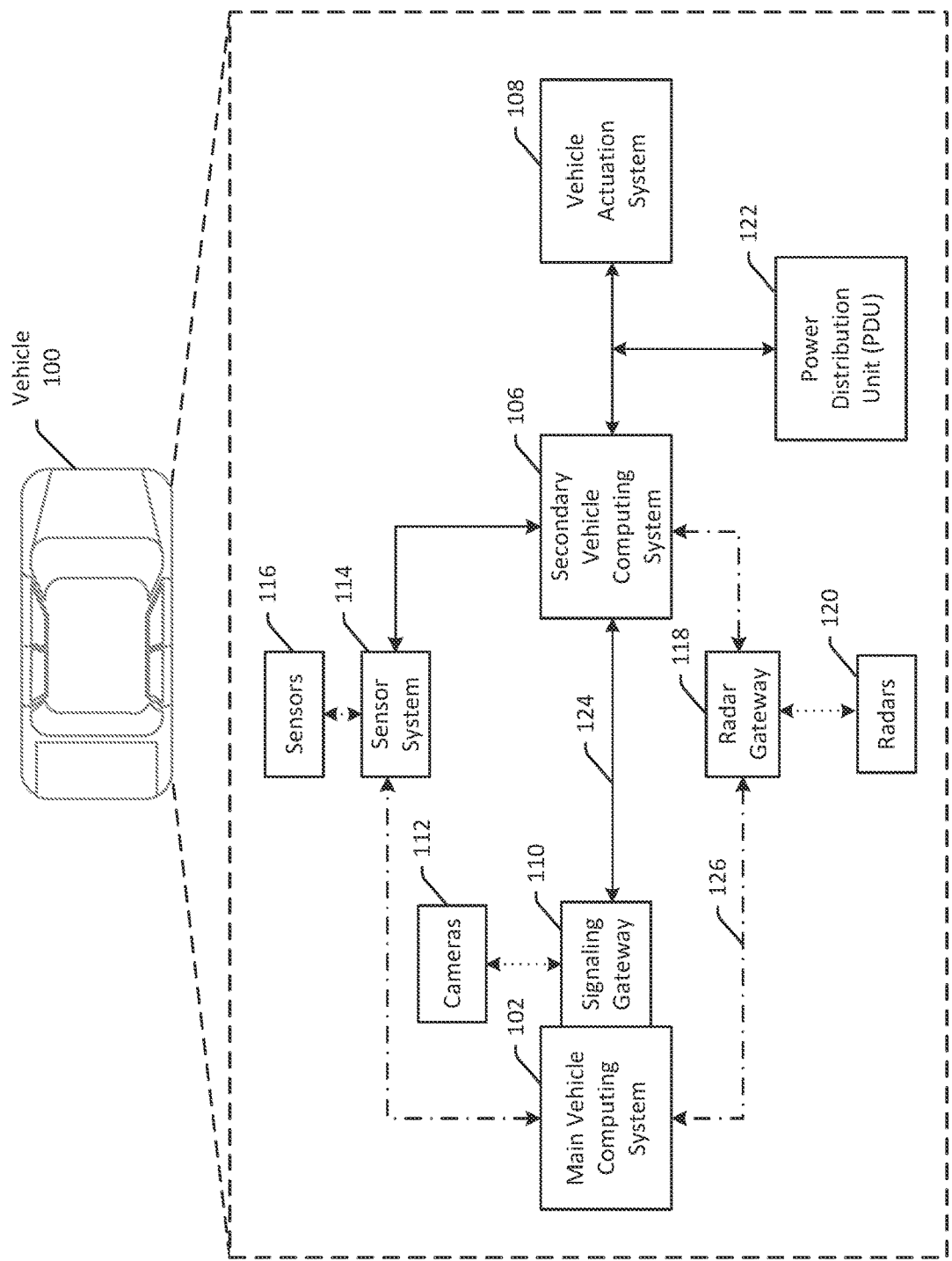
FIG. 1 is a schematic block diagram depicting various vehicle components and vehicle communication networks over which the vehicle components can communicate in accordance with example embodiments of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Modern vehicles, such as autonomous vehicles, include a large number of vehicle components needed to support many different vehicle functionalities/technologies. Vehicle components may include a variety of types of mechanical and electrical components. For instance, vehicle components may include various processors/processing circuits such as graphical processing units (GPUs), central processing units (CPUs), application specific integrated circuits (ASICs), field programmable gate arrays (FPGAs), or the like. Vehicle components, in particular autonomous vehicle components, may further include various types of sensors including, without limitation, Light Detection and Ranging (LiDAR) sensors, radars, cameras, Global Positioning System (GPS) receivers, sonar-based sensors, ultrasonic sensors, inertial measurement units (IMUs), accelerometers, gyroscopes, magnetometers, far infrared (FIR) sensors, and so forth.

Embodiments of the invention overcome technical problems specifically arising in the realm of computer-based technology, and more specifically, in the realm of autonomous vehicle technology. In particular, example embodiments of the invention provide technical solutions to the technical problem of detecting when a vehicle component has experienced a fault condition and determining an appropriate vehicle response to a detected fault condition. Such technical solutions are disclosed in the form of systems, methods, non-transitory computer-readable media, techniques, and methodologies for self-detection of a fault condition by a vehicle component, generation of a device health code that includes multiple tiers of information relating to the fault condition experienced by the vehicle component, and broadcasting of the device health code to one or more other vehicle components via one or more vehicle communication networks. Technical solutions to the above-described technical problem are also disclosed in the form of systems, methods, non-transitory computer-readable media, techniques, and methodologies for receiving device health codes from vehicle components via multiple vehicle communication networks over a period of time; determining, from the device health codes that one or more vehicle components have experienced a fault condition; determining at least one recommended vehicle response from the device health codes; retrieving current vehicle operation data; and determining whether to initiate a recommended vehicle response determined from a device health code or an alternate vehicle response based at least in part on an evaluation of the current vehicle operation data.

As previously noted, in example embodiments, a device health code may include multiple information tiers, with each successive information tier providing more detailed and more granular information relating to a fault condition experienced by a vehicle component. For instance, a device health code may include a fault category code indicative of a general fault category to which the fault condition experienced by the vehicle component belongs. Example general fault categories may include, for example, initialization error, power failure, internal communication error, and so forth. In example embodiments, the fault category code may correspond to the highest information tier in the device health code, representing the most general and least granular information relating to the fault condition.

Further, in example embodiments, the device health code may include a second information tier including, for example, a cross-device error code. The cross-device error code may provide more detailed information than the fault category code such as an indication that the fault condition is a type of fault experienced by a particular subset of vehicle components (e.g., vehicle components of a particular broad-based type such as sensors). For instance, the cross-device error code may indicate that the fault condition corresponds to a certain amount of sensor data loss resulting from a data capturing problem, a data transmission problem, or the like. In addition, in example embodiments, the device health code may include a third information tier that provides even more detail on the fault condition than the second information tier. As a non-limiting example, the third information tier may include a device-specific error code that can take on various error code values indicative of fault characteristics specific to the particular type of device that generated and broadcasted the device health code. For instance, the device-specific error code for a LiDAR may indicate that the LiDAR is experiencing a rotation error (e.g., has ceased rotating or is experiencing degraded rotation).

Further, in some example embodiments, the device health code may further include a reaction code that corresponds to a recommended vehicle response to the fault condition experienced by the vehicle component and identified in the device health code. The reaction code may correspond to one of a group of potential vehicle responses including, without limitation, a human driver taking over control of the vehicle (or the vehicle coming to an immediate stop in the current traveling lane if no human driver is present); pull the vehicle over to a curb or shoulder; operate the vehicle in a limited speed mode; complete the vehicle trip; report error information only; and so forth.

In example embodiments, a vehicle component may be configured to self-detect a fault condition that it experiences and generate a corresponding device health code that provides various tiers of information relating to the fault condition. The vehicle component may then broadcast the device health code on one or more vehicle communication networks so that other vehicle components connected to the a vehicle communication network(s) can learn of the fault condition. In some example embodiments, a vehicle component that experiences a fault condition may generate a corresponding health code and broadcast the code on multiple vehicle communication networks, at least one of which may be a time-sensitive communication network. A time-sensitive vehicle communication network may refer to a real-time communication vehicular network such as an Ethernet-based network. The Institute of Electrical and Electronic Engineers (IEEE) 1000BASE-T1 Time-Sensitive Networking (TSN) communication standard is one example of such a network.

Self-reporting of a device health code that is indicative of a vehicle fault condition experienced by a vehicle component via broadcasting of the code on a vehicle communication network such as a real-time vehicle communication network enables other vehicle components in the vehicle ecosystem to learn of the fault condition in real time and initiate appropriate vehicle response measure(s). For instance, if the fault condition relates to a particular sensor, a main vehicle computing platform may ignore readings from the sensor or use historical or forecasted sensor readings as part of its calculations after learning of the fault condition via the health code broadcasted over the real-time network. As another non-limiting example, if the fault condition is experience by the a main vehicle computing platform, a secondary vehicle safety computing platform may take over some or all functions from the main platform upon receiving the device health code broadcasted by the main platform over the real-time communication network. In example embodiments, the broadcasting of device health codes via a real-time vehicle communication network enables fault handling for vehicle components across the vehicle ecosystem including, without limitation, sensor faults, computational faults, vehicle control faults, and the like.

FIG. 1 is a schematic block diagram depicting various components of a vehicle 100 and various vehicle communication networks over which the vehicle components can communicate in accordance with example embodiments of the invention. The vehicle 100 may be any type of vehicle containing any number of wheels, axles, and the like. The vehicle 100 may be a driverless vehicle capable of operating fully autonomously without any manual human input; a semi-autonomous vehicle capable of performing one or more vehicle functions fully autonomously but requiring some level of manual input; or the like. Even if the vehicle 100 is an autonomous/driverless vehicle with fully autonomous capabilities, a human driver may nonetheless be present to take over manual control in the case of a fault condition occurring that necessitates such an action.

In example embodiments, the vehicle components may include a main vehicle computing system/platform 102 and a secondary vehicle computing system/platform 106. The main vehicle computing system 102 may be configured to handle complex calculations and computing functions in connection with, for example, vehicle control and navigation tasks/processing such as in a driverless context. The secondary vehicle computing system 106 may be configured to handle vehicle control and navigation tasks/processing of lesser complexity than the main computing system 102 as well as to potentially take over some amount of processing from the main computing system 102 in response to excessive processing load on the main computing system 102 and/or a fault condition experienced by the main computing system 102. In some example embodiments, the secondary vehicle computing system 106 may be a vehicle safety system such as a minimal risk condition control (MRCC) system.

In example embodiments, the main computing system 102 may be communicatively coupled to one or more cameras 112 via a signaling gateway 110. The cameras 112 may be positioned inside the vehicle 100 or at an exterior of the vehicle 100. The cameras 112 may be configured to capture image data, video data, audio data, or the like at any suitable frame rate. In some example embodiments, images captured by the cameras 112 may be subjected to various types of object perception processing to identify potential obstacles in the road, which the vehicle 100 can then navigate around using automated vehicle navigation capabilities, for example.

The vehicle component ecosystem of the vehicle 100 may further include a sensor system 114. The sensor system 114 may be, for example, an N-box or other system that coordinates the receipt of sensor data from various vehicle sensors 116 and transmission of the sensor data to the main vehicle computing system 102 and the secondary vehicle computing system 106. The sensor system 114 may further facilitate the transmission of control commands or the like from the main vehicle computing system 102 to the various sensors 116 such as commands that dictate a rate at which a sensor captures data or a rate at which at which a sensor spins (e.g., a Light Detection and Ranging (LiDAR) sensor position on a roof of the vehicle 100, for example). The sensors 116 may include LiDARs, Global Positioning System (GPS) receivers, radios, inertial sensors, temperature sensors, vibration sensors, and so forth. While the sensors 116 are shown as being distinct from the sensor system 114, it should be appreciated that the sensor system 114 may include one or more of the sensors 116.

The vehicle component ecosystem of the vehicle 100 may further include a radar gateway 118 that facilitates communication between the one or more radars 120 and the main vehicle computing system 102 as well as the secondary vehicle computing system 106. In addition, the vehicle component ecosystem includes a power distribution unit (PDU) 122 and a vehicle actuation system 108. The vehicle actuation system 108 may be, for example, a drive-by-wire (DBW) system that receives vehicle actuation control commands from the main computing system 102, and potentially, from the secondary computing system 106. It should be appreciated that the vehicle components depicted in FIG. 1 are merely illustrative and not exhaustive, and that the vehicle 100 may include numerous other components/systems not depicted. For example, the vehicle 100 may further include various subsystems and their corresponding electronic control units (ECUs) including, without limitation, a transmission subsystem; an airbag subsystem; an antilock braking subsystem; a cruise control subsystem; an electric power steering subsystem; and so forth.

In example embodiments, any of the vehicle components depicted in FIG. 1 may be capable of generating a device health code in response to self-detection of a fault condition and communicating the device health code via one or more vehicle communication networks. In some example embodiments, a vehicle component that experiences a fault condition may communicate the device health code over multiple vehicle communication networks 124, 126. In example embodiments, the communication network 124 may be a controller area network (CAN) vehicle communication network and the communication network 126 may be a time-sensitive network such as an Ethernet-based network. Communication links representative of the network 124 are depicted in FIG. 1 using solid lines and communication links representative of the network 126 are depicted in FIG. 1 using dashed lines. While certain vehicle components are shown as being communicatively coupled via a particular one of the communication networks 124, 126, it should be appreciated that some vehicle components may be communicatively coupled via both communication networks 124, 126. It should further be appreciated that while two example communication networks are described and depicted, any number of vehicle communication networks/communication standards can be used for communication between various components of the vehicle 100.

In some example embodiments, upon self-detecting a fault condition, a vehicle component may generate a device health code indicative of the fault condition and broadcast the health code on both the communication network 124 and the communication 126. In some example embodiments, the device health code may be broadcasted on multiple communication networks for redundancy purposes. In some example embodiments, one of the communication networks (e.g., communication network 126) may be a time-sensitive network that disseminates a broadcasted device health code in real-time to other vehicle components, whereas another communication network (e.g., communication network 124) may introduce some amount of delay in transmitting a device health code from the broadcasting component to other vehicle components.

In certain example embodiments, a vehicle component may only be able to broadcast its device health code on a particular vehicle communication network (e.g., 124 or 126). For instance, a vehicle component may only be communicatively coupled to a particular one of the vehicle communication networks 124 or 126. In such example embodiments, another vehicle component that receives the device health code via a first communication network (e.g., communication network 124) may then re-broadcast the device health code via a second communication network (e.g., communication network 126). Further, in some example embodiments, a vehicle component may periodically generate and broadcast a device health code even when operational status of the vehicle component does indicate the presence of fault condition. When the vehicle component then experiences a fault condition, one or more bits of the periodically broadcasted device health code (e.g., the portions indicative of a fault condition) can be populated/altered to indicate the nature of the fault condition.

Figure 2:
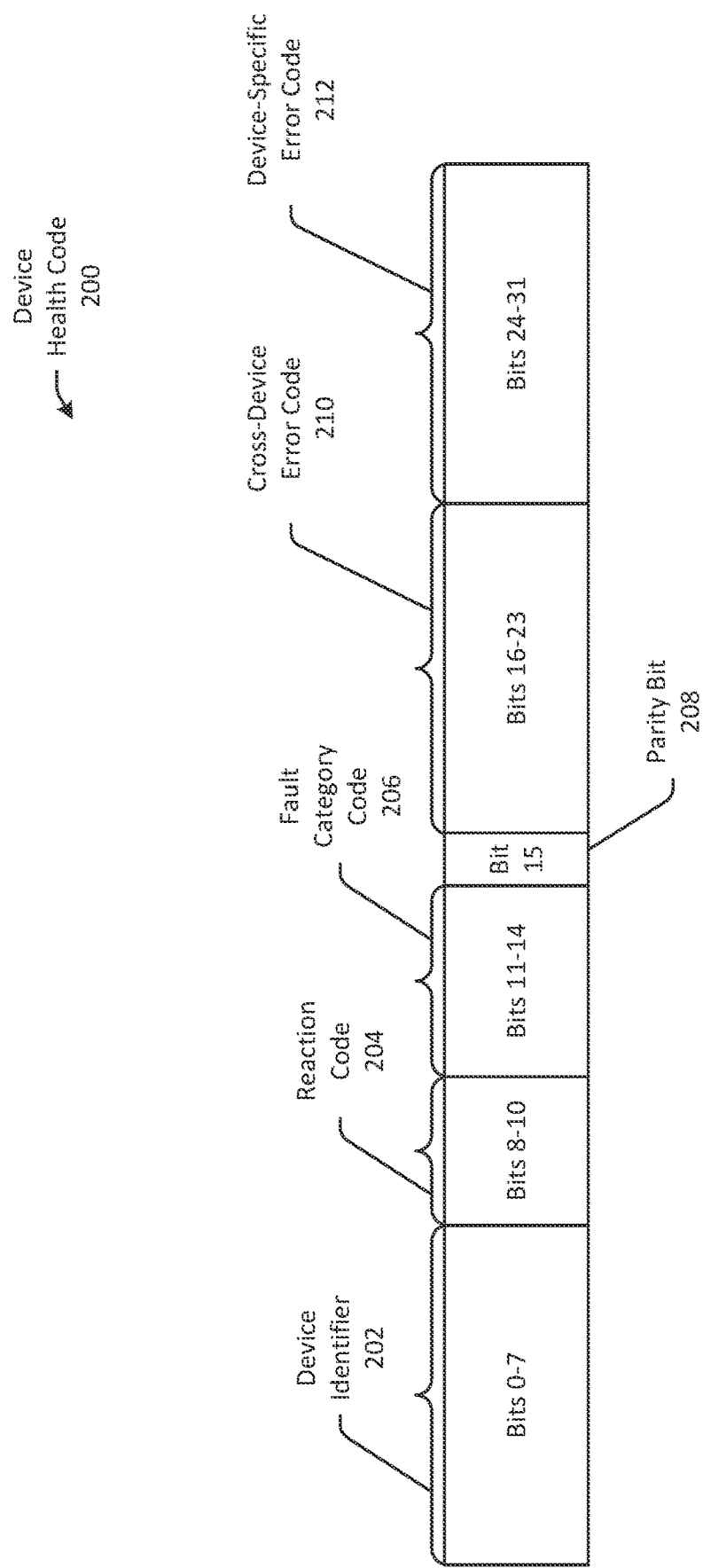
FIG. 2 is a schematic depiction of an example vehicle fault code in accordance with example embodiments of the invention.

FIG. 2 is a schematic depiction of an example vehicle fault code 200 in accordance with example embodiments of the invention. The vehicle fault code 200 may be interchangeably referred to herein as a device health code 200. A vehicle component of the vehicle 100, for example, may generate the device health code 200 responsive to self-detection of a fault condition associated with the vehicle component or may periodically generate the device health code 200 even in those instances in which the vehicle component is not experiencing a fault condition.

In example embodiments, the device health code 200 includes N bits of information, with certain collections of bits corresponding to certain types of information. While the example device health code 200 depicted in FIG. 2 includes a particular number of bits (i.e., 32 bits) and various portions of the code 200 include a specific number of bits, it should be appreciated that any number of total bits may be used to represent a device health code according to example embodiments of the invention, and any respective number of bits may be used to represent any portion (e.g., sub-code) of the device health code.

Referring now to the example device health code 200 in more detail, the code 200 may include a device identifier 202 (corresponding to bits 0-7). The device identifier 202 may be any suitable identifier that uniquely identifies a particular vehicle component in the vehicle 100. In example embodiments, the device identifier 202 may be a part number, a model number, or other identifier that enables identification of the specific vehicle component that generated the code 200. In some example embodiments, a portion of the device identifier 202 (e.g., bits 0-3) may represent a component type of the vehicle component and the remaining bits of the device identifier 202 may identify the specific component.

The device health code 200 may further include multiple information tiers, with each successive information tier providing more detailed and more granular information relating to a fault condition experienced by the vehicle component that generated the code 200. For instance, the device health code 200 may include a fault category code 206 (corresponding to bits 11-14) indicative of a general fault category to which the fault condition experienced by the vehicle component belongs. Example general fault categories may include, for example, initialization error, power failure, internal communication error, and so forth. In example embodiments, the fault category code 206 may correspond to the highest information tier in the device health code 200, representing the most general and least granular information relating to the fault condition.

Further, in example embodiments, the device health code 200 may include a second information tier including, for example, a cross-device error code 210. The cross-device error code 210 may provide more detailed information than the fault category code 206 such as an indication that the fault condition is a type of fault experienced by a particular subset of vehicle components (e.g., vehicle components of a particular broad-based type such as sensors). For instance, the cross-device error code 210 may indicate that the fault condition corresponds to a certain amount of sensor data loss resulting from a data capturing problem, a data transmission problem, or the like. In addition, in example embodiments, the device health code 200 may include a third information tier that provides even more detail on the fault condition than the second information tier. As a non-limiting example, the third information tier may include a device-specific error code 212 that can take on various error code values indicative of fault characteristics specific to the particular type of device that generated and broadcasted the device health code 200. For instance, the device-specific error code 212 for a LiDAR may indicate that the LiDAR is experiencing a rotation error (e.g., has ceased rotating or is experiencing degraded rotation).

Additionally, the example device health code 200 includes a reaction code 204 that corresponds to a recommended vehicle response to the fault condition experienced by the vehicle component and identified in the device health code 200. The reaction code 204 may correspond to one of a group of potential vehicle responses including, without limitation, a human driver taking over control of the vehicle (or the vehicle coming to an immediate stop in the current traveling lane if no human driver is present); pulling the vehicle over to a curb or shoulder; operating the vehicle in a limited speed mode; completing the vehicle trip; reporting error information only; and so forth. The device health code 200 also includes a parity bit (bit 15) which may be used for error-correction purposes.

Figure 3:
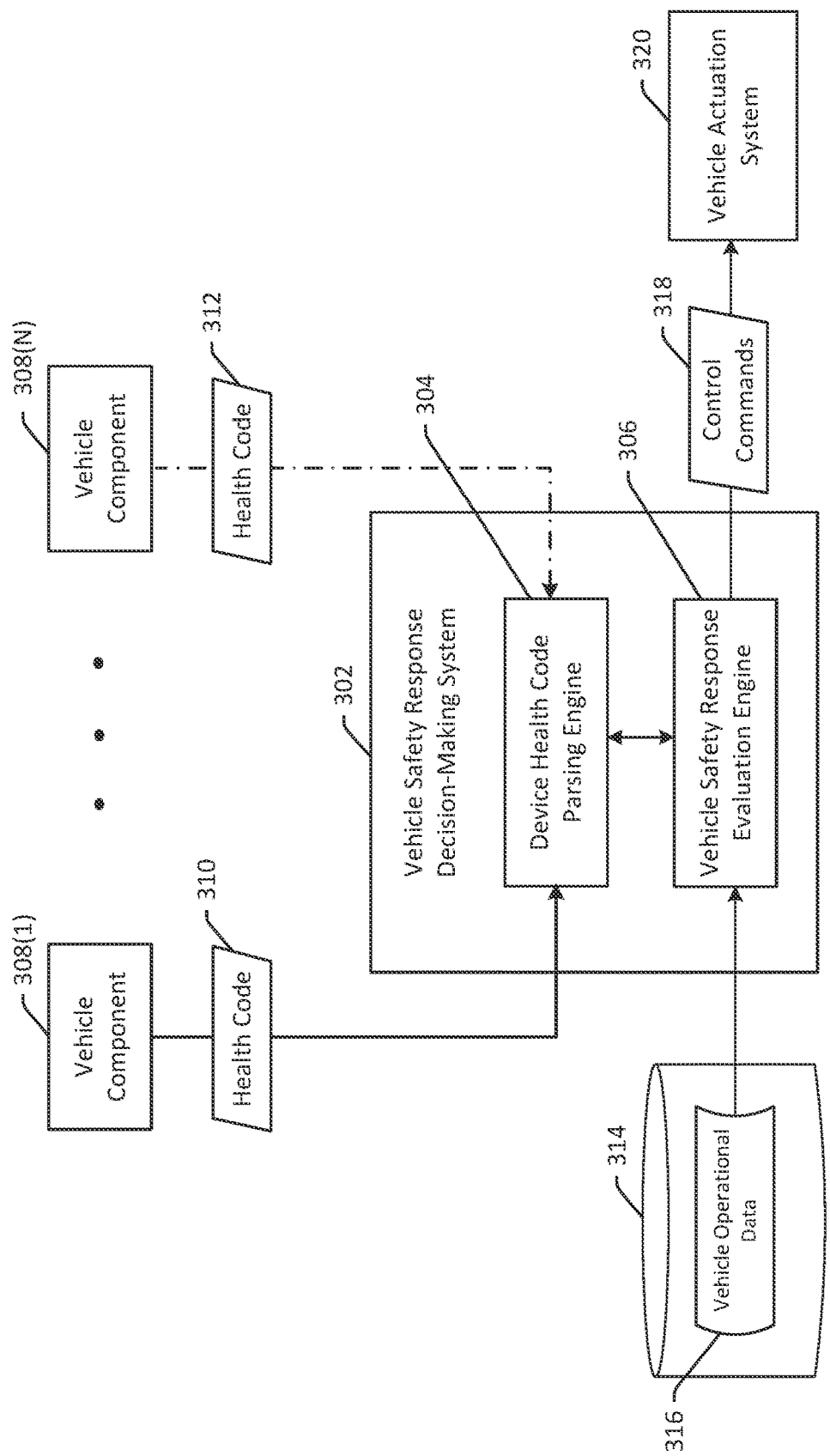
FIG. 3 is a data flow and block diagram illustrating a decision making process for determining a vehicle reaction to fault conditions of one or more vehicle components in accordance with example embodiments of the invention.
Figure 4:
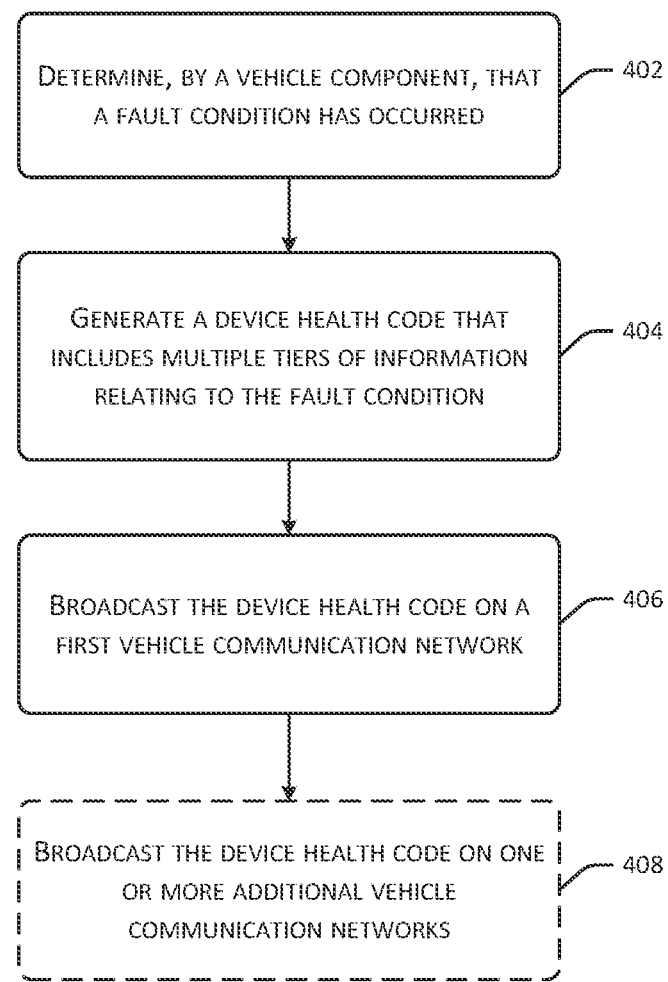
FIG. 4 is a process flow diagram of an illustrative method for generating a device health code and broadcasting the device health code on a vehicle communication network in accordance with example embodiments of the invention.
Figure 5:
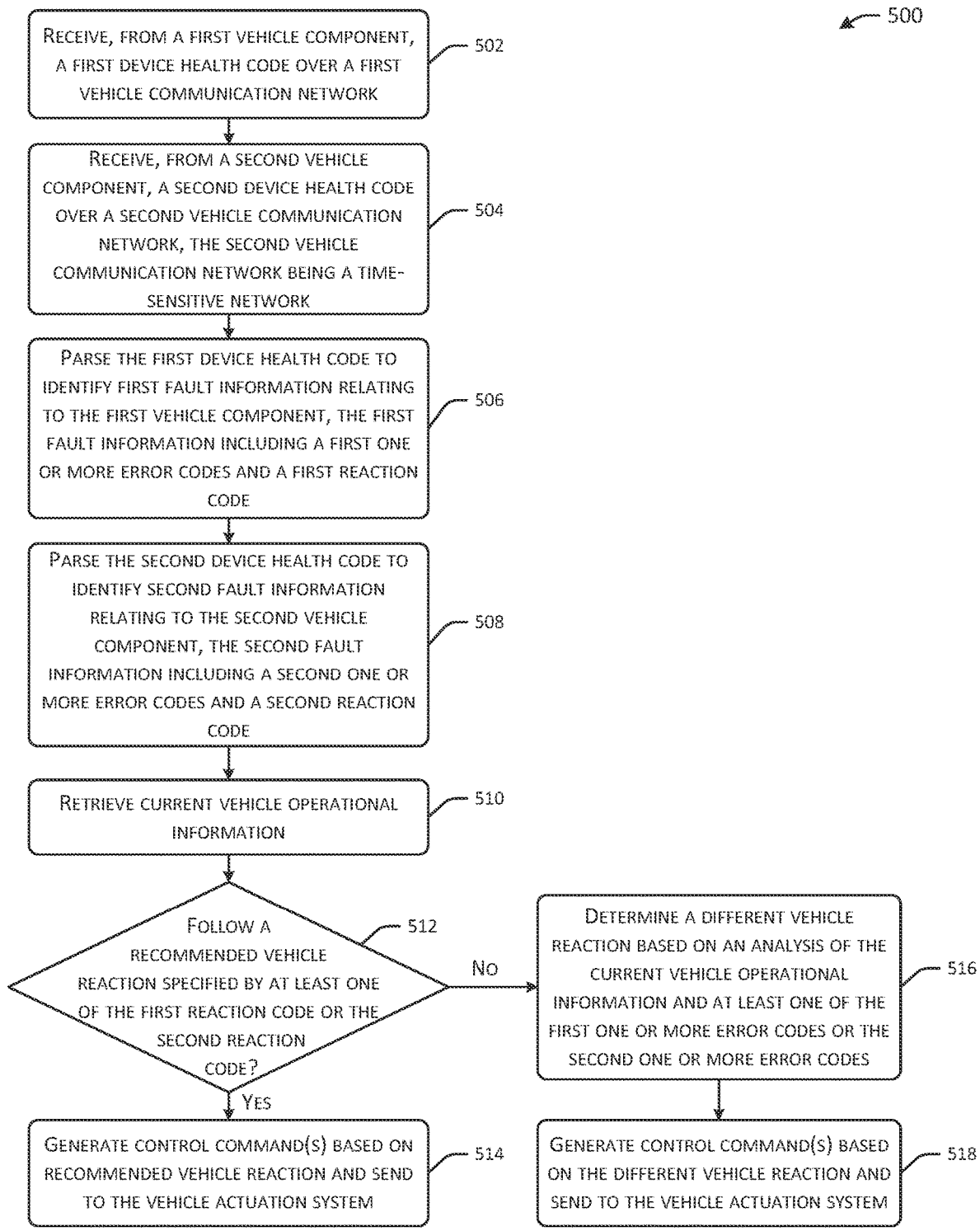
FIG. 5 is a process flow diagram of an illustrative method for determining a vehicle reaction to one or more fault conditions of one or more vehicle components in accordance with example embodiments of the invention.

FIG. 3 is a data flow and block diagram illustrating a decision making process for determining a vehicle reaction to fault conditions of one or more vehicle components in accordance with example embodiments of the invention. FIG. 4 is a process flow diagram of an illustrative method 400 for generating a device health code and broadcasting the device health code on a vehicle communication network in accordance with example embodiments of the invention. FIG. 5 is a process flow diagram of an illustrative method 500 for determining a vehicle reaction to one or more fault conditions of one or more vehicle components in accordance with example embodiments of the invention. Each of FIGS. 4 and 5 will be described in conjunction with FIG. 3 hereinafter.

Referring first to FIG. 4 in conjunction with FIG. 3, at block 402 of the method 400, a vehicle component may self-detect a fault condition. For example, referring to FIG. 3, any of one or more vehicle components 308(1)-308(N) may experience a fault condition and self-detect the fault condition. The vehicle components 308(1)-308(N) may include any of the example vehicle components depicted in FIG. 1 or any other vehicle components. In example embodiments, a vehicle component may be configured to perform periodic/continuous diagnostic self-monitoring, which may include monitoring measurements/values indicative of operational parameters of the vehicle component. If a particular operational parameter (or some threshold number of operational parameters) falls outside of an expected range for more than a threshold period of time, for example, a vehicle component may determine that it has experienced a fault condition.

At block 404 of the method 400, the vehicle component that experienced the fault condition may generate a device health code that includes multiple tiers of information relating to the fault condition. For instance, if the vehicle component 308(1) experienced the fault condition at block 402, it may generate device health code 310. Similarly, if the vehicle component 308(N) experienced the fault condition at block 402, it may generate device health code 312. In some example embodiments, any one or more of vehicle components 308(1)-308(N) may periodically generate device health codes even when not experiencing a fault condition, and may alter information in the health code or populate it with new information when it does experience a fault condition.

At block 406 of the method 400, the vehicle component that experienced the fault condition may broadcast the device health code on a first vehicle communication network. At block 408 of the method 400, the vehicle component may optionally broadcast the device health code on one or more additional vehicle communication networks. For instance, assuming that vehicle component 308(1) experienced the fault condition, vehicle component 308(1) may broadcast the device health code 310 on a time-sensitive, real-time vehicle communication network (e.g., communication network 126, FIG. 1), and optionally, may broadcast the device health code 310 on another communication network such as a CAN network (e.g., communication network 124) if communicatively coupled to such a network. In other example embodiments, if the vehicle component 308(1), for example, is only communicatively coupled to a particular communication network (e.g., communication network 126), then it may broadcast the device health code 310 on that network, and another vehicle component that receives the device health code 310 on that network may broadcast the code 310 on another communication network to which that vehicle component is also communicatively coupled.

Referring now to FIG. 5 in conjunction with FIG. 3, at block 502 of the method 500, a vehicle safety response decision-making system 302 may receive a first device health code (e.g., device health code 310) from a first vehicle component (e.g., vehicle component 308(1)) over a first communication network. Similarly, at block 504 of the method 500, the vehicle safety response decision-making system 302 may receive a second device health code 312 from a second vehicle component (e.g., vehicle component 308(N)) over a second vehicle communication network. In some example embodiments, the second vehicle communication network may be a time-sensitive, real-time communication network.

In example embodiments, the vehicle safety response decision-making system 302 may form at least part of the main vehicle computing system 102 (FIG. 1) and/or the secondary vehicle computing system 106 (FIG. 1). In example embodiments, the vehicle safety response decision-making system 302 includes various computing engines including a device health code parsing engine 304 and a vehicle safety response evaluation engine 306. One or more operations of any of methods 400-600 can be performed by one or more of these engines or the corresponding engines depicted in FIG. 7, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In other example embodiments, these engines/program modules may be customized computer-executable logic implemented within a customized computing machine such as a customized field programmable gate array (FPGA), an application specific integrated circuit (ASIC), and so forth.

A system or device described herein as being configured to implement example embodiments of the invention (e.g., vehicle safety response decision-making system 302) can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data. Any reference herein to a particular engine/program module performing a function/task can include computer-executable instructions of the engine/program module or hardwired logic of the engine/program module being executed by a processing circuit to cause the function/task to be performed.

Referring again to FIG. 5, at block 506 of the method 500, the device health code parsing engine 304 may parse the first device health code (e.g., device health code 310) to identify first fault information relating to the first vehicle component (e.g., vehicle component 308(1)). The first fault information may include a first one or more error codes and a first reaction code contained in the first device health code. For instance, referring to the example device health code 200 depicted in FIG. 2, the first one or more error codes may include the fault category code 206, the cross-device error code 210, and/or the device-specific error code 212. The first reaction code may be reaction code 204.

Similarly, at block 508 of the method 500, the device health code parsing engine 304 may parse the second device health code (e.g., device health code 312) to identify second fault information relating to the second vehicle component (e.g., vehicle component 308(N)). The second fault information may include a second one or more error codes and a second reaction code contained in the second device health code. The second one or more error codes may similarly include a fault category code, a cross-device error code, and/or a device-specific error code.

At block 510 of the method 500, the vehicle safety response evaluation engine 306 may retrieve vehicle operational data 316 relating to the vehicle (e.g., vehicle 100) that includes the first and second vehicle components. In example embodiments, the vehicle safety response evaluation engine 306 may retrieve the vehicle operational data 316 from one or more datastores 314. The vehicle operational data 316 may include data from various sensors in the vehicle (e.g., temperature sensors, vibration sensors, inertial sensors, etc.) that reflect operational characteristics of the vehicle including, without limitation, vehicle speed, vehicle acceleration, power consumption, internal operating temperature, vibration characteristics, or the like.

At block 512 of the method 500, the vehicle safety response evaluation engine 306 may determine whether to follow a recommended vehicle reaction specified by at least one of the first reaction code or the second reaction code. In some example embodiments, the engine 306 may analyze the vehicle operational data 316 to determine to follow the recommended vehicle reaction specified by at least one of the first reaction code or the second reaction code. For instance, if the vehicle operational data 316 indicates that the vehicle is operating within expected operating ranges for various operational parameters, then the engine 306 may follow the recommended vehicle reaction indicated by the first reaction code and/or the second reaction code.

In some example embodiments, the engine 306 may decide to follow the recommended reaction corresponding to the reaction code associated with the more stringent safety measure given the current vehicle operating characteristics. This corresponds to a positive determination at block 512. For instance, if the first reaction code is associated with an immediate vehicle stop measure and the second reaction code is associated with a pull to the side of the road measure, in some circumstances, the engine 306 may follow the action associated with the first reaction code if, for example, this is determined to be the safer measure given the current operational characteristics of the vehicle (e.g., the roadway being traversed, the traffic density, etc.). In other circumstances, for example, if the vehicle is already travelling in a right-most lane, pulling to the shoulder/curb may actually be the safer vehicle response measure. In some example embodiments, one of the first reaction code or the second reaction code may supersede the other by default, and the engine 306 may simply select the higher priority code. In response to a positive determination at block 512, the method 500 may proceed to block 514, where the engine 306 (or another vehicle component such as the main vehicle computing system 102) may generate control command(s) 318 based on the recommend vehicle reaction corresponding to the first and/or the second reaction codes and send the control command(s) 318 to a vehicle actuation system 320 (e.g., vehicle actuation system 108). The vehicle actuation system 320 may then effectuate the vehicle response measure(s) corresponding to the control command(s).

On the other hand, in response to a negative determination at block 512, the method 500 may proceed to block 516, where the engine 306 may determine a different vehicle reaction (vehicle response measure) based on an analysis of the current vehicle operational data 316 and at least one of the first one or more error codes parsed from the first device health code or the second one or more error codes parsed from the second error code. Then, at block 518 of the method 500, the engine 306 (or another vehicle component such as the main vehicle computing system 102) may generate control command(s) 318 indicative of the vehicle reaction determined at block 516, and may send the control command(s) 318 to the vehicle actuation system 320. The vehicle actuation system 320 may be configured to effectuate the vehicle response measure by executing the received control command(s) 318.

For instance, in some example embodiments, the current vehicle operational data 316 may indicate that the recommended actions indicated by the first reaction code and/or the second reaction code are no longer an appropriate response to the fault condition experienced by the first vehicle component and/or the fault condition experienced by the second vehicle component. For example, the first reaction code or the second reaction code may recommend bringing a driverless vehicle to an immediate stop based on the fault conditions experienced by the first and second vehicle components. The vehicle operational data, however, may indicate that the vehicle was able to at least partially recover from/compensate for the fault condition(s), and as such, a less severe vehicle response measure may be warranted. For instance, despite the fault conditions(s), the vehicle may be able to simply operate at a lower speed rather than have to come to an immediate stop.

Figure 6:
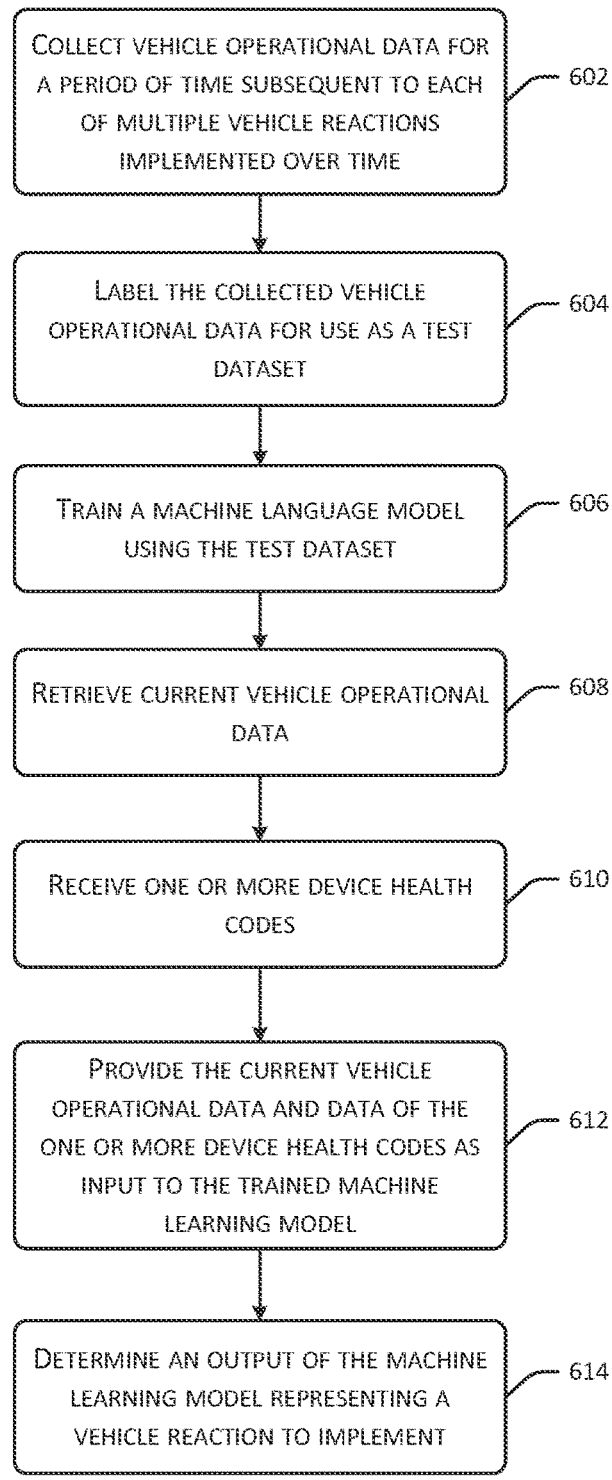
FIG. 6 is a process flow diagram of an illustrative method for using machine learning techniques to refine a determined vehicle reaction to a fault condition experienced by one or more vehicle components in accordance with example embodiments of the invention.

FIG. 6 is a process flow diagram of an illustrative method 600 for using machine learning techniques to refine a determined vehicle reaction to a fault condition experienced by one or more vehicle components in accordance with example embodiments of the invention. In some example embodiments, the vehicle safety response evaluation engine 306 may perform one or more of the operations of method 600.

At block 602 of the method 600, vehicle operational data (e.g., the vehicle operational data 316) may be collected over a period of time. The period of time may be subsequent to multiple vehicle reactions (vehicle response measures) that are implemented in response to various fault conditions experienced by one or more vehicle components. Thus, the vehicle operational data may reflect vehicle operational characteristics that are observed after various vehicle response measures are taken.

At block 604 of the method 600, the collected operational data may be labeled for use as a test dataset. At block 606 of the method 600, a machine learning model may be trained using the test dataset generated at block 604. The machine learning model may employ any suitable supervised or unsupervised machine learning algorithm. The machine learning model may be trained until a desired accuracy of the model is achieved.

At block 608 of the method 600, current vehicle operational data may be retrieved from, for example, the datastore(s) 318. Then, at block 610 of the method 600, one or more device health codes may be received. As previously noted, the device health codes may be generated upon self-detection of fault conditions by vehicle components, and the vehicle components may then broadcast the device health codes on one or more vehicle communication networks.

At block 612 of the method 600, the current vehicle operational data retrieved at block 608 and the device health code(s) received at block 610 may be provided as input to the trained machine learning model. Then, at block 614 of the method 600, an output of the trained machine learning model may be determined for the input provided at block 612. The output may be a recommended vehicle reaction to implement in response to the fault conditions identified in the device health code(s) received at block 610.

According to the example method 600, artificial intelligence (AI)/machine learning (ML) techniques are used to provide feedback to improve/modify the vehicle response measures that were implemented in response to prior fault conditions experienced by vehicle components based on the outcomes that resulted from implementing such response measures. For example, if X % of Lidar data is missing, the recommendation for the vehicle response measure may be to continue operating the vehicle at a lower speed. But, if the vehicle experiencing additional safety-related problems based on this vehicle response measure, the next time X % of the LiDAR data is missing (or perhaps even a lower threshold), the recommendation may change to halting the vehicle immediately within the current lane or bringing the vehicle to a stop at a curb or shoulder. In addition the recommended vehicle response may be based on different types of driving conditions, road surfaces, terrains, and/or environmental conditions such as visibility, weather conditions, etc.

Hardware Implementation

Figure 7:
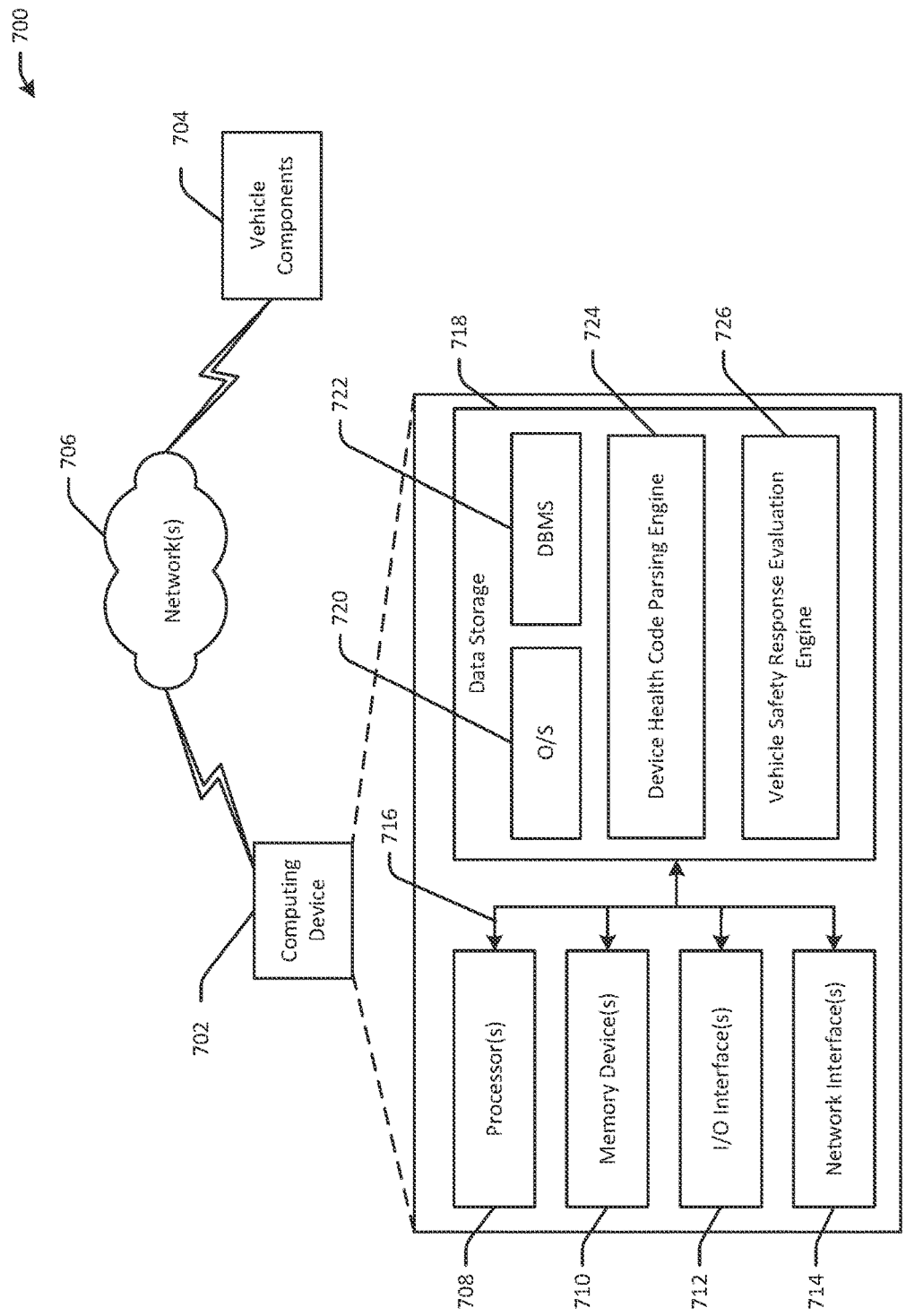
FIG. 7 is a schematic block diagram illustrating an example networked architecture configured to implement example embodiments of the invention.

FIG. 7 is a schematic block diagram illustrating an example networked architecture 700 configured to implement example embodiments of the invention. The networked architecture 700 can include one or more special-purpose computing devices 702 communicatively coupled via one or more networks 706 to various vehicle components 704. The vehicle components 704 may include any of the example types of components described herein including, without limitation, commercial components (e.g., GPUs, CPUs, ASICs, FPGAs, etc.); automotive-grade components (e.g., automotive-grade microcontrollers, other mechanical/electrical automotive parts, etc.); and on-board vehicle sensors (e.g., LiDAR, radars, cameras, GPS receivers, sonar-based sensors, ultrasonic sensors, IMUs, accelerometers, gyroscopes, magnetometers, FIR sensors, etc.). The vehicle components 704 may be provided on an exterior or in an interior of a vehicle such as an autonomous vehicle. The special-purpose computing device(s) 702 may include devices that are integrated with a vehicle and may receive data from the components 704 (e.g., vehicle operational data, sensor data, device health codes, etc.) via a local network connection (e.g., WiFi, Bluetooth, Dedicated Short Range Communication (DSRC), or the like). In other example embodiments, the special-purpose computing device(s) 702 may be provided remotely from a vehicle and may receive data from the components 704 via one or more long-range networks.

The special-purpose computing device(s) 702 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 702 may also combine custom hard-wired logic, ASICs, or FPGAs with custom programming to accomplish the techniques. The special-purpose computing device(s) 702 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 720, including mobile operating systems such as iOS, Android, Chrome OS, or the like, desktop operating systems, mainframe operating systems, or other compatible operating systems. In other embodiments, the computing device(s) 402 may be controlled by a proprietary operating system. The operating system software 420 may control and schedule computer processes for execution; perform memory management; provide file system, networking, and I/O services; and provide user interface functionality, such as a graphical user interface ("GUI").

While the computing device(s) 702 and/or the sensors 704 may be described herein in the singular, it should be appreciated that multiple instances of any such component can be provided and functionality described in connection any particular component can be distributed across multiple instances of such a component. In certain example embodiments, functionality described herein in connection with any given component of the architecture 700 can be distributed among multiple components of the architecture 700. For example, at least a portion of functionality described as being provided by a computing device 702 may be distributed among multiple such computing devices 702.

The network(s) 706 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 706 can have any suitable communication range associated therewith and can include, for example, global networks (e.g., the Internet), metropolitan area networks (MANs), wide area networks (WANs), local area networks (LANs), or personal area networks (PANs). In addition, the network(s) 706 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 can include one or more processors (processor(s)) 708, one or more memory devices 710 (generically referred to herein as memory 710), one or more input/output ("I/O") interface(s) 712, one or more network interfaces 714, and data storage 718. The computing device 702 can further include one or more buses 716 that functionally couple various components of the computing device 702. The data storage may store one or more engines, program modules, components, or the like including, without limitation, a device health code parsing engine 724 and a vehicle safety response evaluation engine 726. Each of the engines/components depicted in FIG. 7 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques. In example embodiments, the vehicle component health monitoring engine 724 and the task scheduler 730 may execute on an automotive-grade microcontroller or the like.

The bus(es) 716 can include at least one of a system bus, a memory bus, an address bus, or a message bus, and can permit the exchange of information (e.g., data (including computer-executable code), signaling, etc.) between various components of the computing device 702. The bus(es) 716 can include, without limitation, a memory bus or a memory controller, a peripheral bus, an accelerated graphics port, and so forth. The bus(es) 716 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 710 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 710 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 710 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 710 may include the data storage 106(1)-106(P) and/or the data storage 120 depicted in FIG. 1. Alternatively, the data storage 106(1)-106(P) may be hard disk storage forming part of the data storage 718 and/or the data storage 120 may be a form of RAM or cache memory that is provided as part of the FOV semantics computing machine 724 itself.

The data storage 718 can include removable storage and/or non-removable storage including, but not limited to, magnetic storage, optical disk storage, and/or tape storage. The data storage 718 can provide non-volatile storage of computer-executable instructions and other data. The memory 710 and the data storage 718, removable and/or non-removable, are examples of computer-readable storage media (CRSM) as that term is used herein. The data storage 718 can store computer-executable code, instructions, or the like that can be loadable into the memory 710 and executable by the processor(s) 708 to cause the processor(s) 708 to perform or initiate various operations. The data storage 718 can additionally store data that can be copied to memory 710 for use by the processor(s) 708 during the execution of the computer-executable instructions. Moreover, output data generated as a result of execution of the computer-executable instructions by the processor(s) 708 can be stored initially in memory 710 and can ultimately be copied to data storage 718 for non-volatile storage.

More specifically, the data storage 718 can store one or more operating systems (O/S) 720 and one or more database management systems (DBMS) 722 configured to access the memory 710 and/or one or more external datastore(s) (not depicted) potentially via one or more of the networks 706. In addition, the data storage 718 may further store one or more program modules, applications, engines, computer-executable code, scripts, or the like. For instance, any of the engines/components depicted in FIG. 7 may be implemented as software and/or firmware that includes computer-executable instructions (e.g., computer-executable program code) loadable into the memory 710 for execution by one or more of the processor(s) 708 to perform any of the techniques described herein.

Although not depicted in FIG. 7, the data storage 718 can further store various types of data utilized by engines/ components of the computing device 702. Such data may include, without limitation, sensor data, feedback data including historical sensor operational data, initial parameter data, or the like. Any data stored in the data storage 718 can be loaded into the memory 710 for use by the processor(s) 708 in executing computer-executable program code. In addition, any data stored in the data storage 718 can potentially be stored in one or more external datastores that are accessible via the DBMS 722 and loadable into the memory 710 for use by the processor(s) 708 in executing computer-executable instructions/program code.

The processor(s) 708 can be configured to access the memory 710 and execute computer-executable instructions/program code loaded therein. For example, the processor(s) 708 can be configured to execute computer-executable instructions/program code of the various engines/components of the FOV semantics computing machine 724 to cause or facilitate various operations to be performed in accordance with one or more embodiments of the invention. The processor(s) 708 can include any suitable processing unit capable of accepting data as input, processing the input data in accordance with stored computer-executable instructions, and generating output data. The processor(s) 708 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 708 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 708 can be made capable of supporting any of a variety of instruction sets.

Referring now to other illustrative components depicted as being stored in the data storage 718, the O/S 720 can be loaded from the data storage 718 into the memory 710 and can provide an interface between other application software executing on the computing device 702 and hardware resources of the computing device 702. More specifically, the O/S 720 can include a set of computer-executable instructions for managing hardware resources of the computing device 702 and for providing common services to other application programs. In certain example embodiments, the O/S 720 can include or otherwise control execution of one or more of the engines/program modules stored in the data storage 718. The O/S 720 can include any operating system now known or which can be developed in the future including, but not limited to, any server operating system, any mainframe operating system, or any other proprietary or non-proprietary operating system.

The DBMS 722 can be loaded into the memory 710 and can support functionality for accessing, retrieving, storing, and/or manipulating data stored in the memory 710, data stored in the data storage 718, and/or data stored in external datastore(s). The DBMS 722 can use any of a variety of database models (e.g., relational model, object model, etc.) and can support any of a variety of query languages. The DBMS 722 can access data represented in one or more data schemas and stored in any suitable data repository. Datastore(s) that may be accessible by the computing device 702 via the DBMS 722, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 712 can facilitate the receipt of input information by the computing device 702 from one or more I/O devices as well as the output of information from the computing device 702 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 702 or can be separate therefrom. The I/O devices can further include, for example, any number of peripheral devices such as data storage devices, printing devices, and so forth.

The I/O interface(s) 712 can also include an interface for an external peripheral device connection such as universal serial bus (USB), FireWire, Thunderbolt, Ethernet port or other connection protocol that can connect to one or more networks. The I/O interface(s) 712 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 can further include one or more network interfaces 714 via which the computing device 702 can communicate with any of a variety of other systems, platforms, networks, devices, and so forth. The network interface(s) 714 can enable communication, for example, with the sensors 704 and/or one or more other devices via one or more of the network(s) 706. In example embodiments, the network interface(s) 714 provide a two-way data communication coupling to one or more network links that are connected to one or more of the network(s) 706. For example, the network interface(s) 714 may include an integrated services digital network (ISDN) card, a cable modem, a satellite modem, or a modem to provide a data communication connection to a corresponding type of telephone line. As another non-limiting example, the network interface(s) 714 may include a local area network (LAN) card to provide a data communication connection to a compatible LAN (or a wide area network (WAN) component to communicate with a WAN). Wireless links may also be implemented. In any such implementation, the network interface(s) 714 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 704 and the signals on network links and through the network interface(s) 714, which carry the digital data to and from the computing device 702, are example forms of transmission media. In example embodiments, the computing device 702 can send messages and receive data, including program code, through the network(s) 706, network links, and network interface(s) 714. For instance, in the Internet example, a server might transmit a requested code for an application program through the Internet, the ISP, a local network, and a network interface 714. The received code may be executed by a processor 708 as it is received, and/or stored in the data storage 718, or other non-volatile storage for later execution.

It should be appreciated that the engines depicted in FIG. 7 as part of the computing device 702 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 702 and/or hosted on other computing device(s) (e.g., 702) accessible via one or more of the network(s) 702, can be provided to support functionality provided by the engines depicted in FIG. 7 and/or additional or alternate functionality. In addition, engines that support functionality described herein can be implemented, at least partially, in hardware and/or firmware and can be executable across any number of computing devices 702 in accordance with any suitable computing model such as, for example, a client-server model, a peer-to-peer model, and so forth.

It should further be appreciated that the computing device 702 can include alternate and/or additional hardware, software, and/or firmware components beyond those described or depicted without departing from the scope of the invention. More particularly, it should be appreciated that software, firmware, and/or hardware components depicted as forming part of the computing device 702 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 702. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for vehicle component fault detection, the method comprising:
   receiving a first device health code that includes first information relating to a presence or an absence of a first fault condition of a first vehicle component and a first recommended correction in response to the presence of the first fault condition;
   receiving a second device health code that includes second information relating to a presence or an absence of a second fault condition of a second vehicle component and a second recommended correction in response to the presence of the second fault condition;
   selecting, based on one or more external characteristics, a response measure from the first recommended correction, the second recommended correction, and a different response measure, wherein the one or more external characteristics comprise a traffic density or a position indicated by the first recommendation correction or by the second recommended correction;
   implementing the recommended correction; and
   selectively broadcasting the first device health code or the second device health code on a vehicle communication network.

2. The computer-implemented method of claim 1, wherein the vehicle communication network is a first vehicle communication network, the method further comprising:
   broadcasting the first device health code or the second device health code on a second vehicle communication network different from the first vehicle communication network.

3. The computer-implemented method of claim 2, wherein the second vehicle communication network is a time-sensitive vehicle communication network.

4. The computer-implemented method of claim 1, further comprising:
   collecting vehicle operational data for a period of time subsequent to implementation of the response measure; and
   utilizing the vehicle operational data to train a machine learning model to determine a vehicle reaction to the first fault condition or the second fault condition.

5. The computer-implemented method of 1, wherein the first information includes a first information tier comprising a fault category code indicative of a fault category that includes the first fault condition and a second information tier comprising a cross-device error code indicating that the first fault condition is one of a set of fault conditions specific to a set of vehicle components that share one or more operating characteristics.

6. The computer-implemented method of claim 5, wherein the first information further includes a third information tier comprising a device-specific error code indicating a more detailed characteristic of the first fault condition that is not determinable from the fault category code or the cross-device error code.

7. The computer-implemented method of 1, further comprising:
   determining that the first vehicle component has recovered from the first fault condition;
   generating an updated first device health code indicating that the first vehicle component is not experiencing the first fault condition; and
   broadcasting the updated first device health code on the vehicle communication network.

8. The computer-implemented method of claim 1, wherein determining that the first vehicle component has experienced the first fault condition comprises executing, by the first vehicle component, a detection algorithm to self-identify the presence of the first fault condition.

9. The computer-implemented method of claim 1, further comprising:
   iteratively modifying the first recommended correction in response to outcomes of implementing the first vehicle response measure, wherein the iteratively modifying comprises modifying the first recommended correction to a more drastic recommended correction or increasing a degree or an extent of the first vehicle response measure in response to the first recommended correction failing to fully resolve the first fault condition.

10. A system for vehicle component fault detection, the system comprising:
    at least one processor; and
    at least one memory storing computer-executable instructions, wherein the at least one processor is configured to access the at least one memory and execute the computer-executable instructions to:
      receive a first device health code that includes first information relating to a presence or an absence of a first fault condition of a first vehicle component and a first recommended correction in response to the presence of the first fault condition;
      receive a second device health code that includes second information relating to a presence or an absence of a second fault condition of a second vehicle component and a second recommended correction in response to the presence of the second fault condition;
      select, based on one or more external characteristics, a response measure from the first recommended correction, the second recommended correction, and a different response measure, wherein the one or more external characteristics comprise a traffic density or a position indicated by the first recommendation correction or by the second recommended correction;
      implement the recommended correction; and
      selectively broadcast the first device health code or the second device health code on a vehicle communication network.

11. The system of claim 10, wherein the vehicle communication network is a first vehicle communication network, and wherein the at least one processor is further configured to execute the computer-executable instructions to:

broadcast the first device health code or the second device health code on a second vehicle communication network different from the first vehicle communication network.

12. The system of claim 11, wherein the second vehicle communication network is a time-sensitive vehicle communication network.

13. The system of claim 10, herein the at least one processor is further configured to execute the computer-executable instructions to:
   collect vehicle operational data for a period of time subsequent to implementation of the response measure; and
   utilize the vehicle operational data to train a machine learning model to determine a vehicle reaction to the first fault condition or the second fault condition.

14. The system of claim 10, wherein the first information includes a first information tier comprising a fault category code indicative of a fault category that includes the first fault condition and a second information tier comprising a cross-device error code indicating that the first fault condition is one of a set of fault conditions specific to a set of vehicle components that share one or more operating characteristics.

15. The system of claim 14, wherein the first information further includes a third information tier comprising a device-specific error code indicating a more detailed characteristic of the first fault condition that is not determinable from the fault category code or the cross-device error code.

16. The system of claim 10, wherein the at least one processor is further configured to execute the computer-executable instructions to:
   determine that the first vehicle component has recovered from the first fault condition;
   generate an updated first device a second health code indicating that the first vehicle component is not experiencing the first fault condition; and
   broadcast the updated first device health code on the vehicle communication network.

17. The system of claim 10, wherein the at least one processor is configured to determine that the first vehicle component has experienced the first fault condition by executing the computer-executable instructions to execute a detection algorithm to cause the first vehicle component to self-identify the presence of the first fault condition.

* * * * *